US009074146B2

(12) United States Patent
Zimmerman et al.

(10) Patent No.: US 9,074,146 B2
(45) Date of Patent: Jul. 7, 2015

(54) PROCESS AND APPARATUS FOR PRODUCING DIESEL FROM A HYDROCARBON STREAM

(75) Inventors: Paul R. Zimmerman, Palatine, IL (US); Peter Kokayeff, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 271 days.

(21) Appl. No.: 13/433,765

(22) Filed: Mar. 29, 2012

(65) Prior Publication Data

US 2013/0259765 A1 Oct. 3, 2013

(51) Int. Cl.
*C10G 65/12* (2006.01)
*C10G 49/00* (2006.01)
*C10G 45/02* (2006.01)
C10G 49/22 (2006.01)
B01J 8/04 (2006.01)

(52) U.S. Cl.
CPC .............. *C10G 65/12* (2013.01); *C10G 49/002* (2013.01); *C10G 49/22* (2013.01); *B01J 8/0453* (2013.01); *C10G 2300/1048* (2013.01); *C10G 2300/1055* (2013.01); *C10G 45/02* (2013.01)

(58) Field of Classification Search
USPC .............................. 422/630, 631–635; 208/61
See application file for complete search history.

(56) References Cited

U.S. PATENT DOCUMENTS

| 3,184,402 | A | | 5/1965 | Kozlowski et al. | |
|---|---|---|---|---|---|
| 3,230,164 | A | * | 1/1966 | Williams et al. | 208/89 |
| 3,506,567 | A | * | 4/1970 | Barger et al. | 208/89 |
| 3,666,657 | A | | 5/1972 | Thompson et al. | |
| 4,673,487 | A | | 6/1987 | Miller | |
| 5,609,752 | A | | 3/1997 | Del Rossi et al. | |
| 6,531,054 | B1 | | 3/2003 | Gerritsen et al. | |
| 6,630,066 | B2 | * | 10/2003 | Cash et al. | 208/58 |
| 6,929,738 | B1 | | 8/2005 | Riley et al. | |
| 7,238,277 | B2 | * | 7/2007 | Dahlberg et al. | 208/58 |
| 7,431,828 | B2 | | 10/2008 | Hunter et al. | |
| 7,622,034 | B1 | | 11/2009 | Thakkar et al. | |
| 2003/0000867 | A1 | | 1/2003 | Reynolds | |
| 2004/0035752 | A1 | | 2/2004 | Marchal-George et al. | |
| 2007/0068851 | A1 | | 3/2007 | Hunter et al. | |
| 2008/0156694 | A1 | | 7/2008 | Chapus et al. | |
| 2009/0095656 | A1 | | 4/2009 | Kokayeff et al. | |
| 2012/0004478 | A1 | | 1/2012 | Umansky et al. | |
| 2013/0256191 | A1 | | 10/2013 | Zimmerman et al. | |
| 2013/0256192 | A1 | | 10/2013 | Zimmerman et al. | |
| 2013/0259764 | A1 | | 10/2013 | Zimmerman et al. | |
| 2013/0259765 | A1 | | 10/2013 | Zimmerman et al. | |

OTHER PUBLICATIONS

Bhaskar, "Mild Hydrocracking of Vacuum Gas Oils to Improve FCC Performance and Maximize Distillate Yields", Petroleum Science and Technology, vol. 20, Nos. 7 & 8, pp. 879-886, 2002.

(Continued)

*Primary Examiner* — Lessanework Seifu
(74) *Attorney, Agent, or Firm* — James C. Paschall (57) ABSTRACT

A process and apparatus are disclosed for hydrotreating a hydrocarbon feed in a hydrotreating unit and hydrocracking a second hydrocarbon stream in a hydrocracking unit. The hydrocracking unit and the hydrotreating unit may share the same recycle gas compressor. A make-up hydrogen stream may also be compressed in the recycle gas compressor. A hydrocracking separator separates recycle gas and hydrocarbons from the hydrocracking unit to be processed with effluent from the hydrotreating unit.

11 Claims, 2 Drawing Sheets

(56) References Cited

OTHER PUBLICATIONS

Cheng, "Deep removal of sulfur and aromatics from diesel through two-stage concurrently and countercurrently operated fixed-bed reactors", Chemical Engineering Science 59 (2004) 5465-5472.

Stratiev, "Effect of Feedstock End Boiling Point on Product Sulphur during Ultra Deep Diesel Hydrodesulphurization", Oil Gas European Magazine, International Edition, vol. 30, pp. 188-192, Apr. 2004.

Speight, (1999), The Chemistry and Technology of Petroleum, Marcel Dekker, Inc., Table 1-3.

* cited by examiner

PROCESS AND APPARATUS FOR PRODUCING DIESEL FROM A HYDROCARBON STREAM

FIELD OF THE INVENTION

The field of the invention is the production of diesel by hydrotreating and hydrocracking.

BACKGROUND OF THE INVENTION

Hydrocracking refers to a process in which hydrocarbons crack in the presence of hydrogen and catalyst to lower molecular weight hydrocarbons. Depending on the desired output, the hydrocracking unit may contain one or more beds of the same or different catalyst. Hydrocracking is a process used to crack hydrocarbon feeds such as vacuum gas oil (VGO) to diesel including kerosene and gasoline motor fuels.

Mild hydrocracking is generally used upstream of a fluid catalytic cracking (FCC) or other process unit to improve the quality of an unconverted oil that can be fed to the downstream unit, while converting part of the feed to lighter products such as diesel. As world demand for diesel motor fuel is growing relative to gasoline motor fuel, mild hydrocracking is being considered for biasing the product slate in favor of diesel at the expense of gasoline. Mild hydrocracking may be operated with less severity than partial or full conversion hydrocracking to balance production of diesel with the FCC unit, which primarily is used to make naphtha. Partial or full conversion hydrocracking is used to produce diesel with less yield of the unconverted oil which can be fed to a downstream unit.

Due to environmental concerns and newly enacted rules and regulations, saleable diesel must meet lower and lower limits on contaminates, such as sulfur and nitrogen. New regulations require essentially complete removal of sulfur from diesel. For example, the ultra low sulfur diesel (ULSD) requirement is typically less than 10 wppm sulfur.

Hydrotreating refers to a process in which olefins and aromatics are saturated and heteroatoms, such as sulfur, nitrogen and metals are removed from the hydrocarbon feedstock over catalyst in the presence of hydrogen. Hydrotreating is an essential step in the production of ULSD.

There is a continuing need, therefore, for improved methods of producing more diesel from hydrocarbon feedstocks than gasoline. Such methods must ensure that the diesel product meets increasingly stringent product requirements.

BRIEF SUMMARY OF THE INVENTION

In a process embodiment, the invention comprises a process for producing diesel from a hydrocarbon stream comprising hydrotreating a hydrocarbon stream in the presence of a hydrotreating hydrogen stream and hydrotreating catalyst. A hydrotreating effluent stream is separated into a vaporous hydrotreating effluent stream comprising hydrogen and a liquid hydrotreating effluent stream. The liquid hydrotreating effluent stream is fractionated to provide a diesel stream. Lastly, the diesel stream is hydrocracked in the presence of a hydrocracking hydrogen stream and hydrocracking catalyst to provide a hydrocracking effluent stream.

In an additional process embodiment, the invention further comprises a process for producing diesel from a hydrocarbon stream comprising hydrotreating a hydrocarbon stream in the presence of a hydrotreating hydrogen stream and hydrotreating catalyst to provide a hydrotreating effluent stream. The hydrotreating effluent stream is separated into a vaporous hydrotreating effluent stream comprising hydrogen and a liquid hydrotreating effluent stream. The vaporous hydrotreating effluent stream is compressed to provide a compressed hydrogen stream. A hydrocracking hydrogen stream is taken from the compressed hydrogen stream. The liquid hydrotreating effluent stream is fractionated to provide a diesel and heavier stream. Lastly, the diesel and heavier stream is hydrocracked in the presence of the hydrocracking hydrogen stream and hydrocracking catalyst to provide a hydrocracking effluent stream.

In an alternative process embodiment, the invention further comprises a process for producing diesel from a hydrocarbon stream comprising hydrotreating a hydrocarbon stream in the presence of a hydrotreating hydrogen stream and hydrotreating catalyst to provide a hydrotreating effluent stream. The hydrotreating effluent stream is separated into a vaporous hydrotreating effluent stream comprising hydrogen and a liquid hydrotreating effluent stream. The liquid hydrotreating effluent stream is fractionated to provide a diesel stream. The diesel stream is hydrocracked in the presence of the hydrocracking hydrogen stream and hydrocracking catalyst at a pressure of about 6.9 MPa (gauge) (1000 psig) to about 11.0 MPa (gauge) (1600 psig) to provide a hydrocracking effluent stream. Lastly, the hydrocracking effluent stream is fractionated to provide a low sulfur diesel stream.

In an apparatus embodiment, the invention comprises an apparatus for producing diesel from a hydrocarbon stream comprising a hydrotreating reactor for hydrotreating a hydrocarbon stream in the presence of a hydrotreating hydrogen stream and hydrotreating catalyst to provide a hydrotreating effluent stream. A separator in communication with the hydrotreating reactor is for separating the hydrotreating effluent stream into a vaporous hydrotreating effluent stream comprising hydrogen and a liquid hydrotreating effluent stream. A hydrotreating fractionation column is in communication with the separator for fractionating liquid hydrotreating effluent to provide a diesel stream at a diesel outlet. Lastly, a hydrocracking reactor is in downstream communication with the separator and the hydrotreating fractionation column for hydrocracking the diesel stream in the presence of a hydrocracking hydrogen stream and hydrocracking catalyst to provide a hydrocracking effluent stream.

In an additional apparatus embodiment, the invention further comprises an apparatus for producing diesel from a hydrocarbon stream comprising a hydrotreating reactor for hydrotreating a hydrocarbon stream in the presence of a hydrotreating hydrogen stream and hydrotreating catalyst to provide a hydrotreating effluent stream. A separator is in communication with the hydrotreating reactor for separating the hydrotreating effluent stream into a vaporous hydrotreating effluent stream comprising hydrogen and a liquid hydrotreating effluent stream. A hydrotreating fractionation column is in communication with the separator for fractionating the liquid hydrotreating effluent stream to provide a diesel stream at a bottom outlet. Lastly, a hydrocracking reactor is in downstream communication with the separator and the bottom outlet of the hydrotreating fractionation column for hydrocracking the diesel stream in the presence of a hydrocracking hydrogen stream and hydrocracking catalyst to provide a hydrocracking effluent stream.

In a further apparatus embodiment, the invention comprises an apparatus for producing diesel from a hydrocarbon stream comprising a hydrotreating reactor for hydrotreating a hydrocarbon stream in the presence of a hydrotreating hydrogen stream and hydrotreating catalyst to provide a hydrotreating effluent stream. A separator is in communication with the hydrotreating reactor for separating the hydrotreating effluent stream into a vaporous hydrotreating effluent stream comprising hydrogen and a liquid hydrotreating effluent stream. A recycle compressor is in communication with the hydrotreating separator for compressing the vaporous hydrotreating effluent stream to provide a compressed hydrogen stream. A hydrotreating fractionation column is in communication with the separator for fractionating the liquid hydrotreating effluent stream to provide a diesel stream at a diesel outlet. A hydrocracking reactor is in downstream communication with the separator and the hydrotreating fractionation column and the recycle compressor for hydrocracking the diesel stream in the presence of a hydrocracking hydrogen stream and a hydrocracking catalyst to provide a hydrocracking effluent stream.

In a process embodiment, the invention comprises a process for producing diesel from a hydrocarbon stream comprising hydrotreating a first hydrocarbon stream in the presence of a hydrotreating hydrogen stream and hydrotreating catalyst to provide a hydrotreating effluent stream. A second hydrocarbon stream is hydrocracked in the presence of a hydrocracking hydrogen stream and hydrocracking catalyst to provide a hydrocracking effluent stream. The hydrocracking effluent stream is separated into a vaporous hydrocracking effluent stream comprising hydrogen and a liquid hydrocracking effluent stream. Lastly, the vaporous hydrocracking effluent stream is mixed with the hydrotreating effluent stream.

In an alternative process embodiment, the invention comprises a process for producing diesel from a hydrocarbon stream comprising hydrotreating a first hydrocarbon stream in the presence of a hydrotreating hydrogen stream and hydrotreating catalyst to provide a hydrotreating effluent stream. The hydrotreating effluent stream is separated into a vaporous hydrotreating effluent stream comprising hydrogen and a liquid hydrotreating effluent stream. A stream comprising liquid hydrotreating effluent is fractionated to provide a diesel stream. The diesel stream is hydrocracked in the presence of a hydrocracking hydrogen stream and hydrocracking catalyst to provide a hydrocracking effluent stream. The hydrocracking effluent stream is separated into a vaporous hydrocracking effluent stream comprising hydrogen and a liquid hydrocracking effluent stream. Lastly, the vaporous hydrocracking effluent stream is mixed with the hydrotreating effluent stream.

In a further process embodiment, the invention comprises a process for producing diesel from a hydrocarbon stream comprising hydrotreating a first hydrocarbon stream in the presence of a hydrotreating hydrogen stream and hydrotreating catalyst to provide a hydrotreating effluent stream. A second hydrocarbon stream is hydrocracked in the presence of a hydrocracking hydrogen stream and hydrocracking catalyst to provide a hydrocracking effluent stream. The hydrocracking effluent stream is separated into a vaporous hydrocracking effluent stream comprising hydrogen and a liquid hydrocracking effluent stream. The vaporous hydrocracking effluent stream is mixed with the hydrotreating effluent stream. Lastly, a stream comprising liquid hydrocracking effluent is fractionated to provide a low sulfur diesel stream.

In an apparatus embodiment, the invention comprises an apparatus for producing diesel from a hydrocarbon stream comprising a hydrotreating reactor for hydrotreating a first hydrocarbon stream in the presence of a hydrotreating hydrogen stream and hydrotreating catalyst to provide a hydrotreating effluent stream. A hydrotreating fractionation column is in communication with the hydrotreating reactor for fractionating a liquid hydrotreating effluent stream. A hydrocracking reactor is for hydrocracking a second hydrocarbon stream in the presence of a hydrocracking hydrogen stream and hydrocracking catalyst to provide a hydrocracking effluent stream. A hydrocracking separator is in communication with the hydrocracking reactor for separating the hydrocracking effluent stream into a vaporous hydrocracking effluent stream comprising hydrogen and a liquid hydrocracking effluent stream and a hydrotreating effluent line in communication with the hydrocracking separator for mixing the vaporous hydrocracking effluent stream comprising hydrogen with the hydrotreating effluent stream.

In an alternative apparatus embodiment, the invention comprises an apparatus for producing diesel from a hydrocarbon stream comprising a hydrotreating reactor for hydrotreating a first hydrocarbon stream in the presence of a hydrotreating hydrogen stream and hydrotreating catalyst to provide a hydrotreating effluent stream. A hydrotreating fractionation column is in communication with the hydrotreating reactor for fractionating a liquid hydrotreating effluent stream. A hydrocracking reactor is in communication with the hydrotreating fractionation column for hydrocracking a second hydrocarbon stream in the presence of a hydrocracking hydrogen stream and hydrocracking catalyst to provide a hydrocracking effluent stream. A hydrocracking separator is in communication with the hydrocracking reactor for separating the hydrocracking effluent stream into a vaporous hydrocracking effluent stream comprising hydrogen and a liquid hydrocracking effluent stream. A hydrotreating effluent line is in communication with the hydrocracking separator for mixing the vaporous hydrocracking effluent stream comprising hydrogen with the hydrotreating effluent stream.

In a further apparatus embodiment, the invention comprises an apparatus for producing diesel from a hydrocarbon stream comprising a hydrotreating reactor for hydrotreating a first hydrocarbon stream in the presence of a hydrotreating hydrogen stream and hydrotreating catalyst to provide a hydrotreating effluent stream. A hydrotreating fractionation column is in communication with the hydrotreating reactor for fractionating a liquid hydrotreating effluent stream. A hydrocracking reactor is for hydrocracking a second hydrocarbon stream in the presence of a hydrocracking hydrogen stream and hydrocracking catalyst to provide a hydrocracking effluent stream. A hydrocracking separator is in communication with the hydrocracking reactor for separating the hydrocracking effluent stream into a vaporous hydrocracking effluent stream comprising hydrogen and a liquid hydrocracking effluent stream. Lastly, a hydrotreating effluent line is in communication with the hydrocracking separator for mixing the vaporous hydrocracking effluent stream comprising hydrogen with the hydrotreating effluent stream.

The present invention greatly improves the ability to achieve ultra-low sulfur diesel (ULSD) by separating the hydrotreating catalyst and the hydrocracking catalyst into separate stages. The first hydrotreating unit is followed by fractionation. The hydrogen sulfide and ammonia are removed, along with naphtha and light ends, from the diesel stream prior to being fed to the hydrocracking unit. This allows the hydrocracking reactor to operate in a cleaner environment more favorable for sulfur conversion enabling achievement of ULSD. Alternatively, a hydrocracking separator is used to forward vaporous hydrocracked product to be processed with hydrotreating products.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. However, columns that strip with steam do not typically include a reboiler, but they may. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of the reflux or reboil to the column.

As used herein, boiling points refer to the True Boiling Point. The term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "conversion" means conversion of feed to material that boils at or below the diesel boiling range. The cut point of the diesel boiling range is between 343° and 399° C. (650° to 750° F.) using the True Boiling Point distillation method.

As used herein, the term "diesel boiling range" means hydrocarbons boiling in the range of between 132° and 399° C. (270° to 750° F.) using the True Boiling Point distillation method.

DETAILED DESCRIPTION

Mild Hydrocracking (MHC) reactors typically process VGO and produce FCC feed and distillate as the major products. Since MHC reactors are typically operated at low to moderate conversion and lower pressures than full conversion hydrocrackers, the distillate produced from MHC units can be high in sulfur such as 20-150 wppm because the environment in the MHC reactor has a high concentration of hydrogen sulfide. In addition, the high concentration of ammonia in the MHC reactor reduces hydrocracking activity requiring higher operating temperatures further limiting sulfur conversion. As a result, diesel from the MHC reactor must be treated in a distillate hydrotreater to achieve ULSD. The extra processing adds to the capital and operating costs.

The present invention separates the hydrotreating reactor and the hydrocracking reactor into separate stages. The hydrotreating reactor is followed by stripping and fractionation of the lighter products. The hydrogen sulfide and ammonia are removed, along with naphtha and light ends, from the diesel stream prior to being fed to the hydrocracking reactor. This allows the hydrocracking reactor to operate in a cleaner environment more favorable for cracking to distillate range material and for sulfur conversion enabling production of ULSD.

The apparatus and process 8 for producing diesel comprise a compression section 10, a hydrotreating unit 12, and a hydrocracking unit 14. A first hydrocarbon feed is fed to the hydrotreating unit 12 to reduce the nitrogen to levels favorable for hydrocracking, such as 0-100 wppm nitrogen. A significant amount of sulfur is converted to hydrogen sulfide and part of the VGO in the first hydrocarbon feed is converted into diesel and lighter products. A diesel and heavier stream is fractionated from a hydrotreating fractionation column 80 and forwarded to the hydrocracking unit 14 to provide ULSD.

A make-up hydrogen stream in a make-up hydrogen line 20 is fed to at least one compressor 10 which may comprise a train of one or more compressors 10 in communication with the make-up hydrogen line for compressing the make-up hydrogen stream and provide a compressed make-up hydrogen stream in compressed make-up hydrogen line 22. The compressed make-up hydrogen stream in compressed make-up hydrogen line 22 may join with a first compressed recycle hydrogen stream comprising hydrogen in a first split line 24 as hereinafter described to provide a hydrotreating hydrogen stream in a hydrotreating hydrogen line 28.

The hydrotreating hydrogen stream in the hydrotreating hydrogen line 28 may join a first hydrocarbon feed stream in line 30 to provide a hydrotreating feed stream in a first hydrocarbon feed line 34. The first hydrocarbon feed stream may be supplemented with a co-feed from co-feed line 32 to be joined by the hydrotreating hydrogen stream from hydrotreating hydrogen line 28.

The first hydrocarbon feed stream is introduced in line 30 perhaps through a surge tank. In one aspect, the process and apparatus described herein are particularly useful for hydroprocessing a hydrocarbonaceous feedstock. Illustrative hydrocarbon feedstocks include hydrocarbonaceous streams having components boiling above about 288° C. (550° F.), such as atmospheric gas oils, VGO, deasphalted, vacuum, and atmospheric residua, coker distillates, straight run distillates, solvent-deasphalted oils, pyrolysis-derived oils, high boiling synthetic oils, cycle oils, hydrocracked feeds, cat cracker distillates and the like. Suitable co-feeds in co-feed line 32 may include diesel streams such as coker distillates, straight run distillates, cycle oils and cat cracker distillates boiling in the range of about 149° C. (300° F.) to about 371° C. (700° F.). These hydrocarbonaceous feed stocks may contain from 0.1 to 4 wt-% sulfur.

A suitable hydrocarbonaceous feedstock is a VGO or other hydrocarbon fraction having at least 50 percent by weight, and usually at least 75 percent by weight, of its components boiling at a temperature above about 399° C. (750° F.). A typical VGO normally has a boiling point range between about 315° C. (600° F.) and about 565° C. (1050° F.).

A hydrotreating reactor 36 is in downstream communication with the at least one compressor 10 on the make-up hydrogen line 20 and the first hydrocarbon feed line 34. The first hydrocarbon stream comprising a hydrotreating feed stream in the first hydrocarbon feed line 34 may be heat exchanged with a hydrotreating effluent stream in line 38 and further heated in a fired heater 35 before entering the hydrotreating reactor 36 for the first hydrocarbon stream.

Hydrotreating is a process wherein hydrogen gas is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. Cloud point of the hydrotreated product may also be reduced.

The hydrotreating reactor 36 may comprise more than one vessel and multiple beds of catalyst. The hydrotreating reactor 36 in FIG. 1 has three beds in one reactor vessel, but more or less beds may be suitable. Two to four beds of catalyst in the hydrotreating reactor 36 is preferred. In the hydrotreating reactor, hydrocarbons with heteroatoms are further demetallized, desulfurized and denitrogenated. The hydrotreating reactor may also contain hydrotreating catalyst that is suited for saturating aromatics, hydrodewaxing and hydroisomerization. It is contemplated that one of the beds in the hydrotreating reactor 36 may be a hydrocracking catalyst to open naphthenic rings produced from aromatics saturated in an upstream catalyst bed. Hydrotreating catalyst suited for one or more of the aforementioned desired reactions may be loaded into each of the beds in the hydrotreating reactor. Hydrogen from the hydrotreating hydrogen line 28 may also be fed to the hydrotreating reactor 36 between catalyst beds (not shown).

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same hydrotreating reactor 36. The Group VIII metal is typically present in an amount ranging from 2 to 20 wt-%, preferably from 4 to 12 wt-%. The Group VI metal will typically be present in an amount ranging from 1 to 25 wt-%, preferably from 2 to 25 wt-%.

Preferred hydrotreating reaction conditions include a temperature from 290° C. (550° F.) to 455° C. (850° F.), suitably 316° C. (600° F.) to 427° C. (800° F.) and preferably 343° C. (650° F.) to 399° C. (750° F.), a pressure from 4.1 MPa (600 psig), preferably 6.2 MPa (900 psig) to 13.1 MPa (1900 psig), a liquid hourly space velocity of the fresh hydrocarbonaceous feedstock from 0.5 $hr^{-1}$ to 4 $hr^{-1}$, preferably from 1.5 to 3.5 $hr^{-1}$, and a hydrogen rate of 168 to 1,011 $Nm^3/m^3$ oil (1,000-6,000 scf/bbl), preferably 168 to 674 $Nm^3/m^3$ oil (1,000-4,000 scf/bbl) for diesel feed, with a hydrotreating catalyst or a combination of hydrotreating catalysts. The hydrotreating unit 12 may be integrated with the hydrocracking unit 14, so they both operate at the same pressure accounting for normal pressure drop.

The first hydrocarbon feed that is passed through the hydrotreating reactor 36 is reduced in nitrogen to levels favorable for hydrocracking and also converts a significant amount of organic sulfur. Additionally, the hydrotreating reactor converts part of the first hydrocarbon feed stream into diesel and lighter products. A hydrotreating effluent exits the hydrotreating reactor 36 in line 38. At least a portion of the hydrotreating effluent stream 38 may be fractionated downstream of the hydrotreating reactor 36 to produce a diesel stream in line 86.

The hydrotreating effluent in line 38 may be heat exchanged with the hydrotreating feed in line 34. In an embodiment, a vaporous hydrocracking effluent stream in hydrocracking separator overhead line 98 as hereinafter described may join the hydrotreating effluent stream in hydrotreating effluent line 38 and be processed together. In a further embodiment, the mixed stream of hydrotreating effluent and the vaporous hydrocracking effluent in mixed line 39 may be delivered to a hydrotreating separator 40. In an embodiment, the mixed stream in mixed line 39 may be cooled before entering the hydrotreating separator 40. The hydrotreating separator 40 is in downstream communication with the hydrotreating reactor 36. Additionally, the vaporous hydrocracking effluent stream may join the hydrotreating effluent in line 38 upstream of the hydrotreating separator 40. The hydrotreating separator may be operated at 46° C. (115° F.) to 63° C. (145° F.) and just below the pressure of the hydrotreating reactor 36 accounting for pressure drop to keep hydrogen and light gases such as hydrogen sulfide and ammonia in the overhead and normally liquid hydrocarbons in the bottoms. Hence, the hydrotreating separator may be a cold separator. The hydrotreating separator 40 separates the hydrotreating effluent stream in line 39 to provide a vaporous hydrotreating effluent stream which in an embodiment comprises the vaporous hydrocracking effluent from line 98 both comprising hydrogen in a hydrotreating separator overhead line 42 and a liquid hydrotreating effluent stream in a hydrotreating separator bottoms line 44. The hydrotreating separator also has a boot for collecting an aqueous phase in line 46.

The liquid hydrotreating effluent stream 44 may be flashed in the hydrotreating flash drum 48 which may be operated at the same temperature as the hydrotreating separator 40 but at a lower pressure of between 1.4 MPa and 3.1 MPa (gauge) (200-450 psig) to provide a light liquid stream in a bottoms line 62 from the liquid hydrocracking effluent stream and a light ends stream in an overhead line 64. The aqueous stream in line 46 from the boot of the hydrotreating separator 40 may also be directed to the hydrotreating flash drum 48. A flash aqueous stream is removed from a boot in the hydrotreating flash drum 48 in line 66. The flash liquid stream in bottoms line 62 comprising liquid hydrotreated effluent may be fractionated in a hydrotreating fractionation column 80.

The hydrotreating flash liquid stream may first be stripped in a hydrotreating stripping column 70 before it is fractionated in the hydrotreating fractionation column 80 to remove more of the light gases from the liquid hydrotreating effluent. The hydrotreating flash liquid stream in bottoms line 62 may be heated and fed to the hydrotreating stripping column 70. The hydrotreating flash liquid stream which is a liquid hydrotreating effluent stream may be stripped with steam from line 72 to provide a light ends stream of hydrogen, hydrogen sulfide, ammonia, steam and other gases in an overhead line 74. A portion of the light ends stream may be condensed and refluxed to the hydrotreating stripper column 70. The hydrotreating stripping column 70 may be operated with a bottoms temperature between about 232° C. (450° F.) and about 288° C. (550° F.) and an overhead pressure of about 690 kPa (100 psig) to about 1034 kPa (gauge) (150 psig). A stripped hydrotreated bottoms stream comprising liquid hydrotreated effluent in bottoms line 76 may be removed from a bottom of the hydrotreating stripping column 70, heated in a fired heater 73 and fed to the hydrotreating fractionation column 80.

The fractionation column 80 may also strip the hydrotreated bottoms stream with steam from line 82 to provide an overhead naphtha stream in line 84. The overhead naphtha stream in line 84 may require further processing before blending in the gasoline pool. It may first require catalytic reforming to improve the octane number. The reforming catalyst may not require the overhead naphtha to be further desulfurized in a naphtha hydrotreater prior to reforming. The hydrotreating fractionation column 80 fractionates the liquid hydrotreating effluent to provide a hydrotreated bottoms stream comprising a diesel and heavier stream having an initial boiling point of about 121° C. (250° F.), preferably about 177° C. (350° F.) to about 288° C. (550° F.) in line 86 and substantially reduced in sulfur and nitrogen content. The diesel and heavier stream in line 86 may be removed from a diesel outlet 86a of the hydrotreating fractionation column 80 which may be in a bottom 88 of the hydrotreating fractionation column for further processing. It is also contemplated that a further side cut be taken to provide a separate light diesel or kerosene stream taken above the bottom 88. A portion of the overhead naphtha stream in line 84 may be condensed and refluxed to the fractionation column 80. The hydrotreating fractionation column 80 may be operated with a bottoms temperature between about 288° C. (550° F.) and about 385° C. (725° F.), preferably between about 315° C. (600° F.) and about 357° C. (675° F.) and at or near atmospheric pressure. A portion of the hydrocracked bottoms may be reboiled and returned to the fractionation column 80 instead of using steam stripping.

A second hydrocarbon stream which may comprise the diesel and heavier stream in line 86 may be joined by the second hydrocracking hydrogen stream in a second hydrogen split line 56 taken from the compressed hydrogen stream in the compressed hydrogen line 52 at the split 54 to provide a hydrocracking feed stream 90. The diesel and heavier stream in line 86 may also be mixed with a co-feed such as a diesel stream that is not shown. The hydrocracking feed stream 90 may be heat exchanged with the hydrocracking effluent in line 94, further heated in a fired heater 91 and directed to a hydrocracking reactor 92. Consequently, the hydrocracking reactor is in downstream communication with the hydrotreating separator 40, the hydrotreating flash drum 48 and the hydrotreating fractionation column 80, specifically the bottom 88 and the diesel outlet 86a thereof, the compressed hydrogen line 52 and the hydrotreating reactor 36. Moreover, the hydrotreating separator 40 is in upstream communication with the any separate hydrocracking reactor 92 in the apparatus and process 8. In the hydrocracking reactor 92, the diesel and heavier stream is hydrocracked in the presence of the hydrocracking hydrogen stream and hydrocracking catalyst to provide a hydrocracking effluent stream in hydrocracking effluent line 94. In an aspect, all of the hydrocracking hydrogen stream is taken from the compressed hydrogen stream in line 52 via the second hydrogen split line 56.

Hydrocracking refers to a process in which hydrocarbons crack in the presence of hydrogen to lower molecular weight hydrocarbons. In the hydrocracking reactor 92, desired conversion of heavier hydrocarbons to diesel range hydrocarbons is obtained along with conversion of the remaining organic sulfur in the diesel and heavier stream facilitated by the clean environment in the reactor.

The hydrocracking reactor 92 may comprise one or more vessels, multiple beds of catalyst in each vessel, and various combinations of hydrotreating catalyst and hydrocracking catalyst in one or more vessels. In some aspects, the hydrocracking reaction provides total conversion of at least 20 vol-% and typically greater than 60 vol-% of the hydrocarbon feed to products boiling below the diesel cut point. The hydrocracking reactor 92 may operate at partial conversion of more than 50 vol-% or full conversion of at least 90 vol-% of the feed based on total conversion. To maximize diesel, full conversion is effective. The first vessel or bed may include hydrotreating catalyst for the purpose of demetallizing, desulfurizing or denitrogenating the hydrocracking feed. Hydrogen from the second hydrogen split line 56 may also be fed to the hydrocracking reactor 92 between catalyst beds (not shown).

The hydrocracking reactor 92 may be operated at mild hydrocracking conditions. Mild hydrocracking conditions will provide about 20 to about 60 vol-%, preferably about 20 to about 50 vol-%, total conversion of the hydrocarbon feed to product boiling below the diesel cut point. In mild hydrocracking, converted products are biased in favor of diesel. In a mild hydrocracking operation, the hydrotreating catalyst has just as much or a greater conversion role than hydrocracking catalyst. Conversion across the hydrotreating catalyst may be a significant portion of the overall conversion. If the hydrocracking reactor 92 is intended for mild hydrocracking, it is contemplated that the mild hydrocracking reactor 92 may be loaded with all hydrotreating catalyst, all hydrocracking catalyst, or some beds of hydrotreating catalyst and some beds of hydrocracking catalyst. In the last case, the beds of hydrocracking catalyst may typically follow beds of hydrotreating catalyst.

Figure 1:
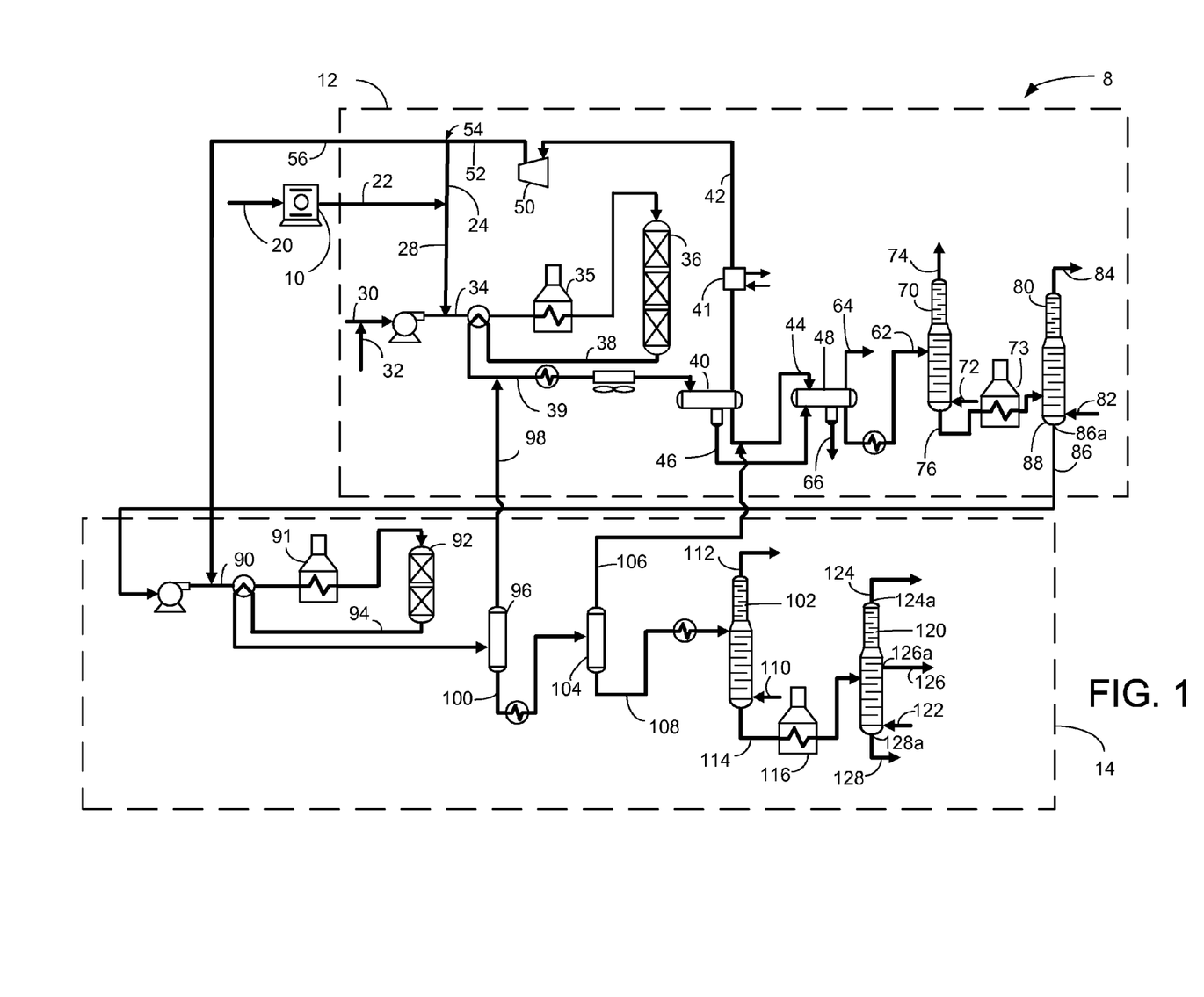
FIG. 1 is a simplified process flow diagram of an embodiment of the present invention.

The hydrocracking reactor 92 in FIG. 1 has two catalyst beds in one reactor vessel. If mild hydrocracking is desired, it is contemplated that the first catalyst bed comprise hydrotreating catalyst or hydrocracking catalyst and the last catalyst bed comprise hydrocracking catalyst. If partial or full hydrocracking is preferred, more beds of hydrocracking catalyst may be used than used in mild hydrocracking.

At mild hydrocracking conditions, the feed is selectively converted to heavy products such as diesel and kerosene with a low yield of lighter hydrocarbons such as naphtha and gas. Pressure is also moderate to limit the hydrogenation of the bottoms product to an optimal level for downstream processing.

In one aspect, for example, when a balance of middle distillate and gasoline is preferred in the converted product, mild hydrocracking may be performed in the hydrocracking reactor 92 with hydrocracking catalysts that utilize amorphous silica-alumina bases or low-level zeolite bases combined with one or more Group VIII or Group VIB metal hydrogenating components. In another aspect, when middle distillate is significantly preferred in the converted product over gasoline production, partial or full hydrocracking may be performed in the hydrocracking reactor 92 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between 4 and 14 Angstroms ($10^{-10}$ meters). It is preferred to employ zeolites having a relatively high silica/alumina mole ratio between 3 and 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between 8-12 Angstroms ($10^{-10}$ meters), wherein the silica/alumina mole ratio is 4 to 6. One example of a zeolite falling in the preferred group is synthetic Y molecular sieve.

The natural occurring zeolites are normally found in a sodium form, an alkaline earth metal form, or mixed forms.

The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least 10 percent, and preferably at least 20 percent, metal-cation-deficient, based on the initial ion-exchange capacity. In another aspect, a desirable and stable class of zeolites is one wherein at least 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between 0.05 percent and 30 percent by weight may be used. In the case of the noble metals, it is normally preferred to use 0.05 to 2 wt-%.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., 371° to 648° C. (700° to 1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between 5 and 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably about 343° C. (650° F.) to about 435° C. (815° F.), a pressure from about 3.5 MPa (500 psig) to about 20.7 MPa (3000 psig), a liquid hourly space velocity (LHSV) from about 1.0 to less than about 2.5 $hr^{-1}$ and a hydrogen rate of about 421 $Nm^3/m^3$ oil (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 $hr^{-1}$ to about 2 $hr^{-1}$ and preferably about 0.7 $hr^{-1}$ to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

The hydrocracking effluent stream in line 94 may be heat exchanged with the hydrocracking feed stream in line 90. The hydrocracking effluent stream in line 94 may be separated in a hydrocracking separator 96 in communication with the hydrocracking reactor 92 to provide a vaporous hydrocracking effluent stream comprising hydrogen in a hydrocracking separator overhead line 98 and a liquid hydrocracking effluent stream in a hydrocracking separator bottoms line 100. The vaporous hydrocracking effluent stream comprising hydrogen may be mixed with the hydrotreating effluent stream in line 38 perhaps prior to cooling and enter into the hydrotreating separator 40 together. Accordingly, the hydrotreating effluent line 38 may be in downstream communication with the hydrocracking separator 96 and the hydrocracking reactor 92.

The hydrocracking separator 96 may be operated between about 149° C. (300° F.). and about 260° C. (500° F.), so it may be considered a warm separator. The pressure of the hydrocracking separator 96 is just below the pressure of the hydrocracking reactor 96 accounting for pressure drop. The hydrocracking separator may be operated to obtain at least 90 wt-% diesel and preferably at least 93 wt-% diesel of the hydrocracking effluent in line 94 in the liquid hydrocracking effluent stream in the bottoms line 100. All of the other hydrocarbons and gases go up in the vaporous hydrocracking effluent stream in line 98 which joins the hydrotreating effluent stream in line 38 and may be processed after cooling therewith first by entering the hydrotreating separator 40. Accordingly, at least a portion of the hydrocracking effluent stream in hydrocracking effluent line 94 provided in the hydrocracking separator overhead stream comprising hydrogen and hydrocarbons lighter than diesel in the warm separator overhead line 98 is mixed with at least a portion of the hydrotreating effluent stream in hydrotreating effluent line 38.

The liquid hydrotreating effluent stream in line 100 may be fractionated in a hydrocracking fractionation column 120. In an aspect, the liquid hydrotreating effluent stream in line 100 may first be flashed in a hydrocracking flash drum 104 which may be operated at the same temperature as the hydrocracking separator 96 but at a lower pressure of between about 1.4 MPa (gauge) (200 psig) and 3.1 MPa (gauge) (450 psig). A hydrocracking flash overhead stream in the hydrocracking flash overhead line 106 may be joined to the liquid hydrotreating effluent stream in the hydrotreating separator bottoms line 44 for further fractionation therewith. Consequently, at least a portion of the hydrocracking effluent stream in line 94 provided in the hydrocracking flash overhead stream in the hydrocracking flash overhead line 106 may be mixed with at least a portion of the hydrotreating effluent stream in line 38 provided in the liquid hydrotreating effluent stream in the hydrotreating separator bottoms line 44.

The hydrocracking flash bottoms stream in line 108 comprising liquid hydrocracking effluent may be heated and fed to a stripper column 102 in downstream communication with the hydrocracking separator 96 and the hydrocracking flash drum 104. The hydrocracking flash liquid bottoms stream in the hydrocracking flash bottoms line 108 may be heated and stripped in the stripper column 102 with steam from line 110 to provide a light ends stream in overhead line 112. The hydrocracking stripping column 102 may be operated with a bottoms temperature between about 232° C. (450° F.) and about 288° C. (550° F.) and an overhead pressure of about 690 kPa (gauge) (100 psig) to about 1034 kPa (gauge) (150 psig). A stripped hydrocracked effluent stream comprising diesel and heavier material in line 114 may be removed from a bottom of the hydrocracking stripping column 102, heated in a fired heater 116 and fed to the hydrocracking fractionation column 120.

The stripped hydrocracked effluent stream comprising liquid hydrocracking effluent in a stripper bottoms line 114 is stripped with steam from line 122 and fractionated in the hydrocracking fractionation column 120 which is in downstream communication with the hydrocracking reactor 92, the hydrocracking separator 96, the hydrocracking flash drum 104 and the hydrocracking stripper column 102.

The hydrocracking fractionation column 120 fractionates the liquid hydrocracking effluent to produces three cuts. A product naphtha stream with low sulfur content is produced in the overhead stream 124 from the overhead outlet 124a. A product diesel stream comprising less than 50 wppm sulfur qualifying it as LSD and preferably less than 10 wppm sulfur qualifying it as ULSD may be recovered as a side cut in line 126 from a diesel side outlet 126a. It is contemplated that the hydrocracking fraction column can be a dividing wall column having a wall (not shown) interposed in the column 120 between the feed inlet and the diesel side outlet 126a. An unconverted oil stream is recovered in a bottoms line 128 from a bottom outlet 128a. The hydrotreated unconverted oil stream may be a clean, excellent feed stock for a fluid catalytic cracking unit.

A portion of the overhead naphtha stream in overhead line 124 may be condensed and refluxed to the hydrocracking fractionation column 120. The hydrocracking fractionation column 120 may be operated with a bottoms temperature between about 288° C. (550° F.) and about 385° C. (725° F.), preferably between about 315° C. (600° F.) and about 357° C. (675° F.) and at or near atmospheric pressure. A portion of the hydrocracked bottoms may be reboiled and returned to the fractionation column 120.

By operating the hydrocracking separator 96 at elevated temperature to reject most hydrocarbons lighter than diesel, the hydrocracking stripping column 102 may be operated more simply because it is not as heavily relied upon to separate naphtha from lighter components and because there is less naphtha left in the hydrocracked effluent to separate from the diesel. Moreover, the hydrocracking separator 96 makes sharing of a hydrotreating separator 40 with the hydrocracking reactor 92 possible and heat useful for fractionation in the stripper column 102 is retained in the hydrocracking liquid effluent.

The vaporous hydrotreating effluent which may be mixed with vaporous hydrocracking effluent stream in the overhead line 42 may be scrubbed with an absorbent solution which may comprise an amine in a scrubber 41 to remove ammonia and hydrogen sulfide as is conventional prior to recycle of the vaporous hydrotreating effluent stream and perhaps the vaporous hydrocracking effluent stream mixed therewith comprising hydrogen to the recycle gas compressor 50.

The mixed vaporous hydrotreating effluent and vaporous hydrocracking effluent stream in line 42 may be compressed in a recycle gas compressor 50 to provide a recycle hydrogen stream in line 52 which may be a compressed vaporous hydrotreating and hydrocracking effluent stream. The recycle gas compressor 50 may be in downstream communication with the hydrocracking reactor 92 and the hydrotreating reactor 36. A split 54 on the recycle hydrogen line 52 provides the first recycle hydrogen split stream in a first split line 24 in upstream communication with the hydrotreating reactor 36 and a hydrocracking hydrogen stream in a second hydrogen split line 56 in upstream communication with the hydrocracking reactor 92.

It is preferred that the compressed make-up hydrogen stream in line 22 join the recycle gas stream in the first split line 24 downstream of the split 54, so the make-up hydrogen will be directed to supplying all of the hydrogen requirements to the hydrotreating reactor 36 or all of the hydrogen requirements to the hydrotreating reactor 36 not filled by the recycle hydrogen stream in line 52. It is also contemplated that the compressed make-up hydrogen stream in line 22 may join the recycle gas stream upstream of the split 54, but this would allow make-up gas to go to the hydrocracking unit 14 as well as to the hydrotreating unit 12. The hydrocarbon feed to the hydrotreating reactor 36 will have much higher coke precursors than the feed to the hydrocracking reactor 92. Hence, using the make-up hydrogen to increase the hydrogen partial pressure in the hydrotreating reactor 36 will enable the catalyst in the hydrotreating reactor to endure more heartily the more deleterious components in the feed. It is also contemplated, but not preferred, that at least a portion of the compressed make-up hydrogen stream in line 22 may feed the recycle hydrogen stream 52 downstream of the recycle gas compressor 50 or feed the vaporous effluent stream in line 42 upstream of the recycle gas compressor 50. It is further contemplated that the make-up gas stream in line 22 may feed the second split line 56 downstream of the split 54.

Figure 2:
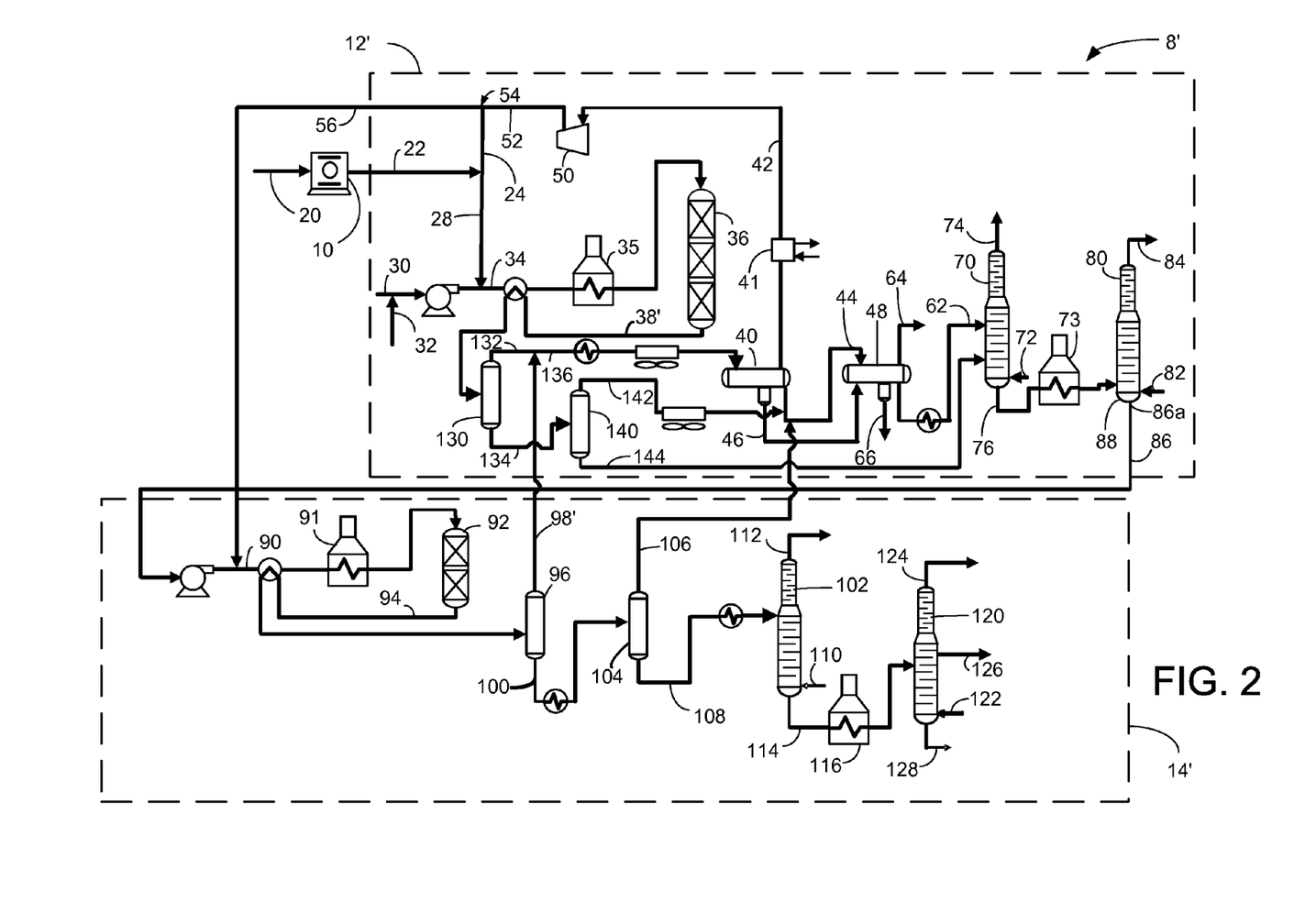
FIG. 2 is a simplified process flow diagram of an alternative embodiment of the present invention.

FIG. 2 illustrates an embodiment of a process and apparatus 8' that utilizes a hot separator 130 to initially separate the hydrocracking effluent in line 38'. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

The hot separator 130 in the hydrotreating unit 12' is in downstream communication with the hydrotreating reactor 36 and provides a vaporous hydrocarbonaceous stream in an overhead line 132 and a liquid hydrocarbonaceous stream in a bottoms line 134. The hot separator 130 may operate at a temperature of about 177° C. (350° F.) to about 343° C. (650° F.) and preferably operates at about 232° C. (450° F.) to about 288° C. (550° F.). The hot separator may be operated at a slightly lower pressure than the hydrotreating reactor 36 accounting for pressure drop. The vaporous hydrocarbonaceous stream in line 132 may be joined by the vaporous hydrocracking effluent stream in line 98' from the hydrocracking section 14' and be mixed and transported together in line 136. The mixed stream in line 136 may be cooled before entering the hydrotreating separator 40. Consequently, the vaporous hydrotreating effluent stream may be separated along with the vaporous hydrocracking effluent stream in the hydrotreating separator 40 to provide the vaporous hydrotreating effluent perhaps mixed with vaporous hydrocracking effluent comprising hydrogen in line 42 and the liquid hydrotreating effluent in line 44 and which are processed as previously described with respect to FIG. 1. The hydrotreating separator 40, therefore, is in downstream communication with the overhead line 132 of the hot separator 130 and perhaps an overhead line 98' of the hydrocracking separator 96.

The liquid hydrocarbonaceous stream in bottoms line 134 may be flashed in a hot flash drum 140 to provide a light ends stream in an overhead line 142 and a heavy liquid stream in a bottoms line 144. The hot flash drum 140 may be operated at the same temperature as the hot separator 130 but at a lower pressure of between about 1.4 MPa (gauge) (200 psig) and about 3.1 MPa (gauge) (450 psig). The light ends stream in the overhead line 142 may be cooled and mixed with the liquid hydrotreating effluent in the hydrotreating separator bottoms line 44 to be processed therewith first in the hydrotreating flash drum 48 in an aspect along with the hydrocracking flash overhead stream from the hydrocracking flash overhead line 106. The heavy liquid stream in bottoms line 144 may be introduced into the hydrotreating stripping column 70 at a lower elevation than the feed point for the light liquid stream in line 62.

The rest of the embodiment in FIG. 2 may be the same as described for FIG. 1 with the previous noted exceptions.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for producing diesel from a hydrocarbon stream comprising:
   a hydrotreating reactor for hydrotreating a first hydrocarbon stream in the presence of a hydrotreating hydrogen stream and hydrotreating catalyst to provide a hydrotreating effluent stream in a hydrotreating effluent line;
   a hydrotreating fractionation column in communication with said hydrotreating reactor for fractionating a liquid hydrotreating effluent stream, said hydrotreating fractionation column being in downstream communication with said hydrotreating effluent line;
   a hydrocracking reactor for hydrocracking a second hydrocarbon stream in the presence of a hydrocracking hydrogen stream and hydrocracking catalyst to provide a hydrocracking effluent stream, said hydrocracking reactor being in communication with a bottom of said hydrotreating fractionation column for hydrocracking a diesel and heavier stream from said hydrotreating fractionation column;
   a hydrocracking separator in communication with said hydrocracking reactor for separating the hydrocracking effluent stream into a vaporous hydrocracking effluent stream comprising hydrogen and a liquid hydrocracking effluent stream and said hydrotreating effluent line in downstream communication with said hydrocracking separator for mixing the vaporous hydrocracking effluent stream comprising hydrogen with the hydrotreating effluent stream; and
   a hydrocracking fractionation column, separate from the hydrotreating fractionation column, in communication with said hydrocracking separator for fractionating a stream comprising liquid hydrocracking effluent to provide a low sulfur diesel stream.

2. The apparatus of claim 1 further comprising a separator in communication with said hydrotreating reactor for separating the hydrotreating effluent stream into a vaporous hydrotreating effluent stream comprising hydrogen and said liquid hydrotreating effluent stream.

3. The apparatus of claim 1 further comprising a compressor in communication with a make-up hydrogen line for compressing a make-up hydrogen stream to provide a compressed make-up hydrogen stream and said hydrotreating reactor being in communication with said compressor.

4. The apparatus of claim 2 further comprising a recycle compressor in communication with the separator and the hydrocracking separator, said recycle compressor for compressing the vaporous hydrotreating effluent stream and the vaporous hydrocracking effluent stream to provide a compressed hydrogen stream and said hydrocracking reactor being in communication with said recycle compressor.

5. The apparatus of claim 1 further comprising a stripper column in communication with said hydrocracking separator for stripping said stream comprising liquid hydrocracking effluent to provide a light ends stream and a stripped liquid hydrocracking effluent stream and said hydrocracking fractionation column is in communication with said stripper column.

6. An apparatus for producing diesel from a hydrocarbon stream comprising:
   a hydrotreating reactor for hydrotreating a first hydrocarbon stream in the presence of a hydrotreating hydrogen stream and hydrotreating catalyst to provide a hydrotreating effluent stream in a hydrotreating effluent line;
   a hydrotreating fractionation column in communication with said hydrotreating reactor for fractionating a liquid hydrotreating effluent stream, said hydrotreating fractionation column being in downstream communication with said hydrotreating effluent line;
   a hydrocracking reactor in communication with said hydrotreating fractionation column for hydrocracking a second hydrocarbon stream in the presence of a hydrocracking hydrogen stream and hydrocracking catalyst to provide a hydrocracking effluent stream, said hydrocracking reactor is in communication with a bottom of said hydrotreating fractionation column for hydrocracking a diesel and heavier stream from said hydrotreating fractionation column;
   a hydrocracking separator in communication with said hydrocracking reactor for separating the hydrocracking effluent stream into a vaporous hydrocracking effluent stream comprising hydrogen and a liquid hydrocracking effluent stream and said hydrotreating effluent line in downstream communication with said hydrocracking separator for mixing the vaporous hydrocracking effluent stream comprising hydrogen with the hydrotreating effluent stream, said hydrotreating fractionation column being in communication with said hydrocracking separator; and
   a hydrocracking fractionation column, separate from the hydrotreating fractionation column, in communication with said hydrocracking separator for fractionating a stream comprising liquid hydrocracking effluent to provide a low sulfur diesel stream.

7. The apparatus of claim 6 further comprising a separator in communication with said hydrotreating reactor for separating the hydrotreating effluent stream into a vaporous hydrotreating effluent stream comprising hydrogen and said liquid hydrotreating effluent stream.

8. The apparatus of claim 7 further comprising a compressor in communication with a make-up hydrogen line for compressing a make-up hydrogen stream to provide a compressed make-up hydrogen stream and said hydrotreating reactor being in communication with said compressor.

9. The apparatus of claim 8 further comprising a recycle compressor in communication with the hydrotreating separator and the hydrocracking separator, said recycle compressor for compressing the vaporous hydrotreating effluent stream and the vaporous hydrocracking effluent stream to provide a compressed hydrogen stream and said hydrocracking reactor being in communication with said recycle compressor.

10. The apparatus of claim 6 further comprising a stripper column in communication with said hydrocracking separator for stripping a stream comprising liquid hydrocracking effluent to provide a light ends stream and a stripped liquid hydrocracking effluent stream and said hydrocracking fractionation column is in communication with said stripper column.

11. An apparatus for producing diesel from a hydrocarbon stream comprising:
 a hydrotreating reactor for hydrotreating a first hydrocarbon stream in the presence of a hydrotreating hydrogen stream and hydrotreating catalyst to provide a hydrotreating effluent stream in a hydrotreating effluent line;
 a separator in communication with said hydrotreating reactor for separating the hydrotreating effluent stream into a vaporous hydrotreating effluent stream comprising hydrogen and said liquid hydrotreating effluent stream, said separator being in downstream communication with said hydrotreating effluent line;
 a hydrotreating fractionation column in communication with said hydrotreating reactor for fractionating said liquid hydrotreating effluent stream;
 a hydrocracking reactor for hydrocracking a second hydrocarbon stream in the presence of a hydrocracking hydrogen stream and hydrocracking catalyst to provide a hydrocracking effluent stream, said hydrocracking reactor being in communication with a bottom of said hydrotreating fractionation column for hydrocracking a diesel and heavier stream from said hydrotreating fractionation column;
 a hydrocracking separator in communication with said hydrocracking reactor for separating the hydrocracking effluent stream into a vaporous hydrocracking effluent stream comprising hydrogen and a liquid hydrocracking effluent stream and said hydrotreating effluent line in downstream communication with said hydrocracking separator for mixing the vaporous hydrocracking effluent stream comprising hydrogen with the hydrotreating effluent stream; and
 a hydrocracking fractionation column, separate from the hydrotreating fractionation column, in communication with said hydrocracking separator for fractionating a stream comprising liquid hydrocracking effluent to provide a low sulfur diesel stream from a side outlet.

\* \* \* \* \*